United States Patent
Blossfeld

[11] Patent Number: 6,144,229
[45] Date of Patent: Nov. 7, 2000

[54] SENSOR DEVICE

[75] Inventor: Lothar Blossfeld, Breitnau, Germany

[73] Assignee: Micronas Intermetall GmbH, Freiburg, Germany

[21] Appl. No.: 09/199,361

[22] Filed: Nov. 25, 1998

[30] Foreign Application Priority Data

Nov. 27, 1997 [EP] European Pat. Off. ............... 97120812

[51] Int. Cl.[7] .................................................. H03K 5/22
[52] U.S. Cl. ............................................................ 327/50
[58] Field of Search .................................. 327/50–52, 54, 327/56, 63, 67, 72–74, 77–80, 90, 205, 511

[56] References Cited

U.S. PATENT DOCUMENTS 5,166,550  11/1992  Matsubara et al. .................. 327/68
5,260,614  11/1993  Theus et al. ........................ 327/362
5,406,202   4/1995  Mehrgardt et al. ................. 324/251

FOREIGN PATENT DOCUMENTS 4338709  12/1993  Germany .
2116325   7/1983  United Kingdom .

OTHER PUBLICATIONS

Patent Abstracts of Japan, vol. 96, No. 5, Mar. 31, 1996.
Copy of European Patent Office Search Report dated Sep. 4, 1998.

*Primary Examiner*—My-Trang Nuton
*Attorney, Agent, or Firm*—Arthur L. Plevy; Buchanan Ingersoll PC

[57] ABSTRACT

A sensor device is disclosed having a controller (9) which defines at least a first operating state (b1) and a second operating state (b2), the first operating state being preferably triggerable by application of a supply voltage ($U_B$). A setting facility (5) adapts the operating range of a measuring facility (2) quickly to the respective DC level (s0) of a sensor signal (s1) in the first operating state (b1), and determines a mean sensor signal value (sm) for tracking purposes in the second operating state (b2). An output circuit (4) provides a first output signal (s3) independent of the sensor signal (s1) in the first operating state and a second output signal (s4) dependent on the superposed sensor signal (s2) in the second operating state (b2).

16 Claims, 2 Drawing Sheets

SENSOR DEVICE

This invention relates to an electronic sensor device comprising a sensor which provides an electric output signal in response to a physical measurand, such as force, pressure, acceleration, magnetic field, or radiation in the optical and nonoptical domains. Frequently, the measurands are superposed on relatively large background signals which are either constant or vary only very slowly. Such background signals may also be offset errors of the sensor array or measuring arrangement. If the sensor signal is purely static, separation is only possible using a chopper principle. If, however, the sensor signal has a frequency spectrum different from zero which is well above the frequencies of the background signal, simple separation is possible by means of filter devices, in the simplest case by capacitive coupling to the respective sensor or the individual amplification stages.

In monolithic integrated sensor circuits, in which besides the electrophysical sensor, a signal processing circuit is included on the same chip, capacitive coupling is generally not possible, since the overall circuit is usually formed from DC-coupled stages. It must therefore be ensured in another manner that the operating range of the individual circuit stages is not exceeded by the DC level of the background signal. This is accomplished using the well-known differential-amplifier principle, namely by processing the difference between the sensor signal superposed on the DC level and a reference level. For this purpose, the operating range of the differential amplifier must be at least as large as the maximum possible sensor signal. For the subsequent stages, the interfering DC level is then no longer present or at least very small. The DC level should therefore be suppressed at the beginning of the signal path, in which case the gain may be small, and the necessary amplification and signal processing should be moved to the subsequent stages.

A particularly critical application for such sensor devices is, for example, in rotating components used in mechanical equipment or in the automotive field to sense rotational speed or position. Frequently, arrangements are used in which the sensor is biased by means of a strong, constant magnetic field (=backbias field). During rotation, a gear of iron material modulates the magnetic flux in the sensor. This modulation is evaluated by the sensor as an information signal. The percentage ratio of modulation to constant magnetic flux is typically between 1% and 10%.

Conditions are similar if capacitive sensors are used to determine force, pressure, or acceleration, because the existing basic capacitance is modulated more or less strongly by the quantity to be measured. Similar problems are encountered with optical sensors, which frequently have to detect an intensity modulation at a relatively high brightness level.

Because of the unfavorable ratio of modulated signal to unmodulated DC signal, stringent requirements are placed on the accuracy and stability of the sensor device. Subsequent compensation for manufacturing and fitting tolerances and for the variations caused during operation by temperature and aging effects is possible, but is generally avoided. More common solutions to these problems are dynamic sensor devices, which can only evaluate dynamic signals. In this approach, the reference level necessary for the DC level compensation is formed by means of a control circuit in which the output of the input amplifier is low-pass-filtered and fed back to the compensation or reference input of this amplifier. If the sensor signal applied to the input amplifier is a differential signal, the associated feedback input is, as a rule, implemented at one of the differential inputs by means of a summing network. Such sensor devices can only process signals which have a minimum frequency.

In many systems, particularly in systems using magnetic-field sensors, a standstill must be sensed in addition to motion or rotation. Furthermore, in position-dependent control systems, information usually must not be lost, e.g., information as to when the first tooth of a gear passes by the sensor after start-up. Such applications can be found, for example, in automotive systems in the fields of engine control, antilock braking, or speed sensing.

For many applications, however, it is sufficient if the lower cutoff frequency of the sensor device is in the range of a few $\frac{1}{10}$ Hz. Dynamic sensors suitable for such low frequency ranges must have a very slow control response, so that after start-up, they are blind to the sensor signals for a prolonged period of time.

The object of the invention is to provide a sensor device which senses very low signal frequencies but, on the other hand, is ready for operation a very short time after turn-on and provides high compatibility with large background signals.

This object, according to the features of claim 1, is attained as follows:

A sensor device includes a controller which defines at least a first operating state and a second operating state, with the first operating state being preferably triggerable by application of a supply voltage, and the sensor device further includes a setting facility which adapts the operating range of a measuring facility to the respective DC level of a sensor signal by means of a setting value in the first operating state and which determines a mean sensor signal value in the second operating state, with an output circuit providing in the first operating state a first output signal, which is independent of the sensor signal, but defined, and in the second operating state a second output signal, which is dependent on a sensor signal superposed on the mean sensor signal value.

The definition of at least a first and a second operating state in accordance with the invention opens the possibility of optimally adapting the operating performance of the sensor device to the start-up condition and the normal operating condition. Trade-offs with respect to the control rate and the requirement for low cutoff frequencies as in purely dynamic sensor devices are not necessary in accordance with the invention. In the first operating state, the setting facility very quickly determines a mean sensor signal value which in the second operating state only needs to follow the slow drift changes. The determination of the mean sensor signal value in the first operating state can be accomplished in various ways. For example, the control slope may be greatly increased. It is also possible to measure the DC level directly by means of a sample-and-hold circuit and then feed this stored analog value to the reference signal input. A similar method uses a digital memory rather than an analog memory, with the previously determined DC level being digitized by means of an analog-to-digital converter. At first glance, this method looks clumsy, but if digital signal processing is performed within the sensor device, the stages provided for this purpose can be used. In addition, the resolution in the first operating state can remain relatively coarse, since fine tracking can be performed in the second operating state. A similar digital method carries out a successive approximation in the first operating state to determine the DC level. Here, too, the successive approximation can be terminated when the setting value determined is less than the signal amplitude to be expected. For the fine tracking, which only needs to follow relatively slow changes, a tracking converter is suitable which follows the changes in LSB steps.

The duration of the first operating state is determined by the controller, which either checks whether the signal after the differential amplifier is sufficiently close to zero, or sets for the first operating state a fixed time which in the digital solution is controlled by an internal clock signal. For gear sensors, this setting process should be complete after 8 to 10 clock pulses, which correspond to approximately 100 µs.

After the DC level of the sensor signal has been "compensated" in the first operating state, in the second operating state the sensor device can immediately detect the superposed sensor signal and form an analog or digital output signal therefrom. To prevent the output signal from being accidentally switched back and forth in the first operating state, a defined state is provided for the output signal in this time range, for example a logic 1 or 0 state, possibly also a floating tri-state condition. If necessary, this signal state is maintained at the beginning of the second operating state until the first change of state is detected in the superposed sensor signal.

Further advantages result for the sensor device if in the second operating state the amplitude of the superposed sensor signal is determined by means of an amplitude detector. With the aid of this amplitude value, a hysteresis threshold can be changed for switching-signal applications or the gain in the signal path is adapted to the magnitude of the superposed sensor signal. This automatic, adaptation makes the sensor device very insensitive to operational and fitting tolerances which affect the signal level.

If the sensor device is used in magnetic gear sensors, the detection of frequencies of a few $\frac{1}{10}$ Hz to 10 kHz is desirable. For the frequency range coverable by the sensor device to become as wide as possible it is important that the signal tracking for the mean sensor signal value be coupled approximately to the respective signal frequency. This is advantageously accomplished by not changing the respective mean sensor signal value between the individual output signals. The mean sensor signal value is to change only within a time interval which begins at the intersection of the superposed sensor signal and the mean sensor signal value and ends with the attainment of a relative extreme value of the superposed sensor signal.

If no output signal is formed in the second operating state during a prolonged time interval, according to a further development of the invention, the controller initiates a third operating state in which the mean sensor signal value is slowly led in the direction of the probably lost mean sensor signal value, with the control direction being determined by the sign of the sensor signal after the differential amplifier or at the output.

The tracking of the mean sensor signal value can be made less dependent on signal disturbances via preset threshold values or filter circuits.

To prevent the mean sensor signal value from being lost in the event of short-time voltage drops or after turnoff, it is advantageous to store it as a digital value in an on-chip dynamic and/or nonvolatile memory device. This stored value is then available for each new starting process, so that the tracking in the first operating state can be faster or the value found will become more accurate. It is also possible, of course, to store other setting and/or control parameters of the setting facility in the memory device. Through the nonvolatile storage, the sensor device is fully operational even after prolonged signal disturbances or supply failures. Short-time signal disturbances or short-time supply failures can also be bridged by means of the dynamic storage of the setting and/or control parameters. Dynamic memories can be fabricated with conventional CMOS processes without additional processing steps, while nonvolatile memory devices are more expensive to manufacture and, in addition, are not writable arbitrarily often.

In the case of Hall-effect sensors, the "first tooth" may have to be detected. This is hardly possible if the mean sensor signal value stored during the first operating state is accidentally the maximum sensor signal, which corresponds to the top of the tooth, and if the output signal is tied to the zero level. In that case, the information on the first tooth will be suppressed. This can be prevented by delivering in the second operating state a pulse of predetermined duration for the first time if a deviation of the superposed sensor signal from the mean sensor signal value stored in the first operating state is detected. In this manner, the leading or trailing side of the first tooth is reliably detected and passed as information to the subsequent circuits.

The invention and further advantageous features will now be explained in greater detail with reference to the accompanying drawings, in which.

Figure 1:
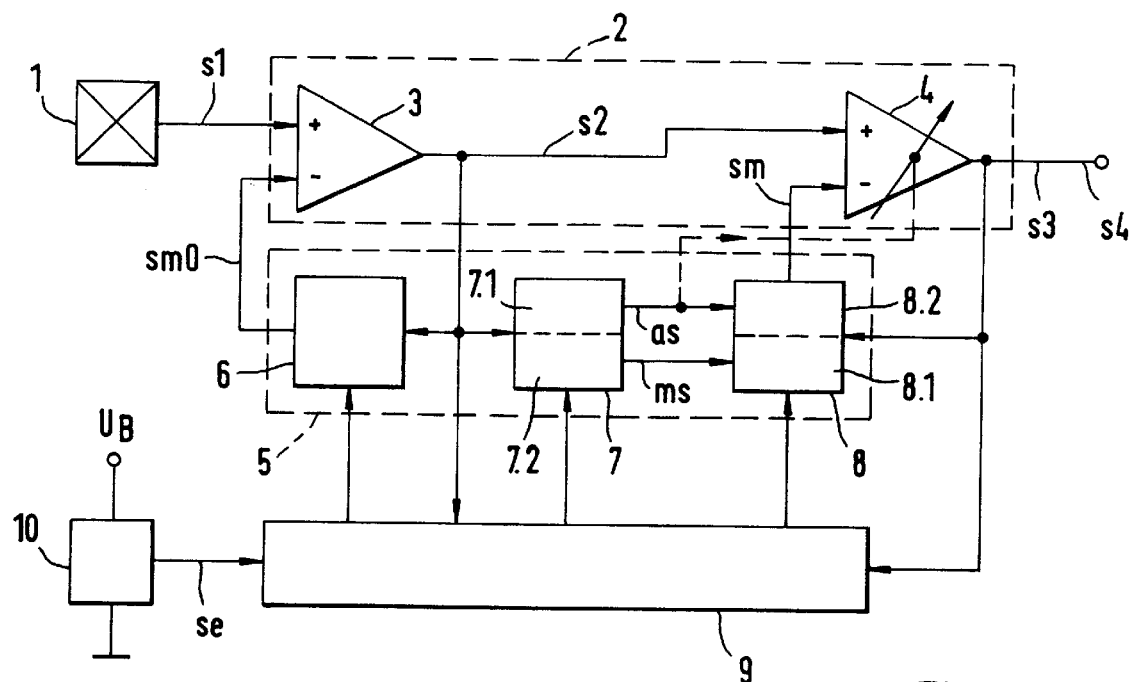
FIG. 1 is a schematic block diagram of a first embodiment of the invention.

The embodiment of the sensor device of FIG. 1 contains in the input section a sensing element or sensor 1 whose output is applied as a sensor signal s1 in unipolar or differential form, the latter if the sensor is, for example, a Hall-effect sensor, to a measuring facility 2. The measuring facility 2 contains an input amplifier 3 which serves essentially to suppress or compensate the DC level s0 (see FIG. 3) of the sensor signal s1. In the simplest case, this is accomplished by means of a differential amplifier to which the sensor signal s1 is applied at one input and the DC level s0, or a setting value sm0 close thereto, at the other.

The output signal of the input amplifier 3 is ideally identical with the required sensor signal s2, which is free of the DC level s0 and of low background signal frequencies. Strictly speaking, the freedom from DC voltage applies only if the quiescent potential at the output of the input amplifier 3 is exactly zero. If the sensor device is of a unipolar design, however, the quiescent potential at the output of the input amplifier 3 will differ from zero and is defined by a fixed quiescent value, which will be assumed in the following to be not disturbing, however. The suppression of the DC level s0 in the input amplifier 3 may require a wide dynamic range at the input end, so that the signal amplification proper must be moved to a second amplifier or to the output circuit 4. If the circuit is a linear circuit, the output signal s4 delivered in the second operating state b2 will be a signal proportional to the superposed sensor signal s2. For switching applications, however, the output circuit 4 will be a comparator which provides a switching signal s4 that is dependent on the polarity of the superposed sensor signal s2 and possibly also on switching thresholds.

Figure 2:
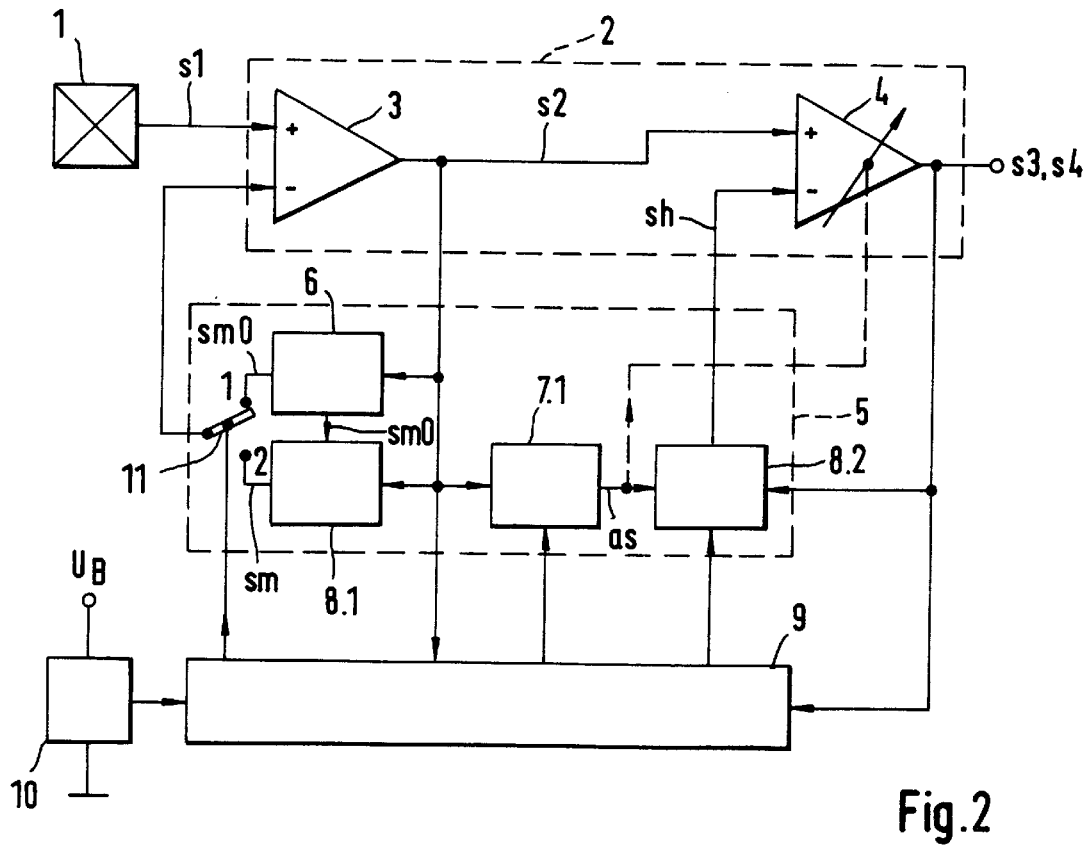
FIG. 2 is a schematic block diagram of a second embodiment of the invention.

The compensation of the DC level s0 is accomplished by means of a setting facility 5, which may also influence the switching thresholds. Essential parts of the setting facility 5 are a DC level detector 6, an analysis circuit 7, and a setter 8. The DC level detector 6 serves to find the DC level s0 or a similar voltage value sm0 as quickly as possible during start-up of the sensor device, and to feed this level or value to the measuring facility 2. This takes place during a first operating state b1, which is initiated by a controller 9 when a turn-on detector 10 signals to it via a turn-on signal se that a supply voltage $U_B$ has been connected to the sensor device. The end of the first operating state is determined either by a preset time interval b1 or by the fact that the superposed sensor signal s2 has become smaller than a predetermined value. The individual stages of the setting facility 5 may be linear stages. Since at least one DC level value from the DC level detector 6 and/or a tracking circuit 8.1 has to be stored in the setting facility 5, in an analog implementation, on-chip capacitors have to be provided in the setting facility 5 for storing these analog values. Since even very low-frequency sensor signals s1 are to be sensed with the sensor device, the capacitors must not be too small. Digital processing in the setting facility, which requires an analog-to-digital converter for the superposed sensor signal s2 and at least one digital-to-analog converter for forming the analog output signals of the setting facility 5, is less critical. The increased complexity is justifiable, since the internal signal processing and storage are then performed via simple digital circuits. The DC level detector 6 may then be designed as a successive approximator, which finds the DC level s0 very quickly and stores this value digitally as a fixed setting value sm0. In the embodiment of FIG. 2, this setting value sm0 is caused to follow the actual signal conditions by means of the tracking circuit 8.1, and is therefore continuously overwritten. The setting value sm0 in FIG. 1 represents a basic setting which in the case of a magnetic-field sensor corresponds to the existing backbias field. The latter remains essentially constant, so that only a relatively small drift needs to be compensated for by the tracking circuit 8.1.

The digital processing also permits an amplitude detector 7.1 and an averager 7.2 to be implemented in the analysis circuit 7 simply by storing relative extreme values. Subtraction of the extreme values provides a double amplitude value as, and addition of the extreme values provides the double value of a median value. The actual amplitude or mean value can be obtained from these values simply by scaling by the factor ½. To suppress interference, the values as, ms may be filtered.

Figure 4:
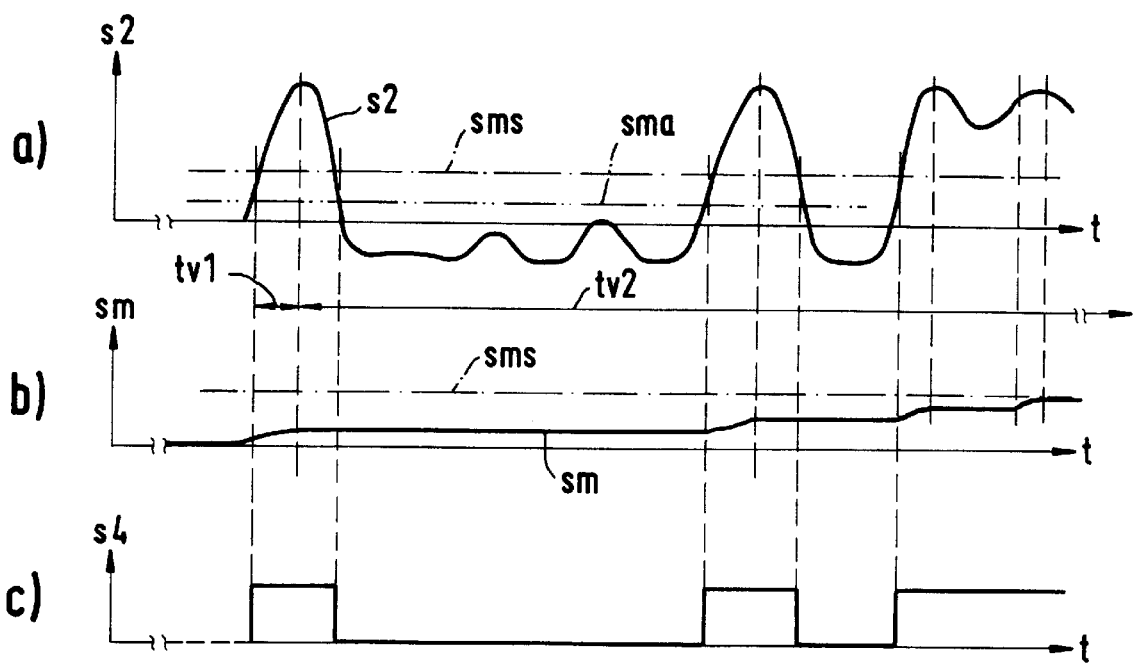
FIG. 4 is a schematic timing diagram showing a mean sensor signal value.

Furthermore, a change in the stored mean sensor signal value sm or sm0 is effected by a change signal which is provided by the controller 9 if the stored values have not changed during a predetermined monitoring period tv2 (see FIG. 4). It is also possible, however, to detect relative extreme values via internal filter circuits and then use these values in the analysis circuit 7 to form a new average value ms. In the digital solution, the controller 9 includes a timer, of course, which determines the expiration of the individual time intervals. If nonvolatile memories are used for the setting facility, the time for the first operating state b1 can be shortened considerably, because once stored, the values are available in each further turn-on process for preliminary adjustment.

FIG. 2 shows a second embodiment of the sensor device, which contains essentially the same subcircuits as the embodiment of FIG. 1. The main difference consists in the fact that the compensation of the DC level s0 and the drift compensation in the first and second operating states b1, b2 are performed only in the input amplifier 3. By means of a switch 11, the output signal sm0 of the DC level detector 6 and the output signal sm of the tracking circuit 8.1 are applied to the reference input of the input amplifier 3 during the first and second operating states b1 and b2, respectively. The corresponding switch positions 1 and 2 are activated by the controller 9 in the first and second operating states b1 and b2, respectively. If the output circuit 4 is to operate as a comparator, its reference input will be connected to a hysteresis setter 8.2 which sets the respective hysteresis threshold sh as a function of the amplitude value as.

Figure 3:
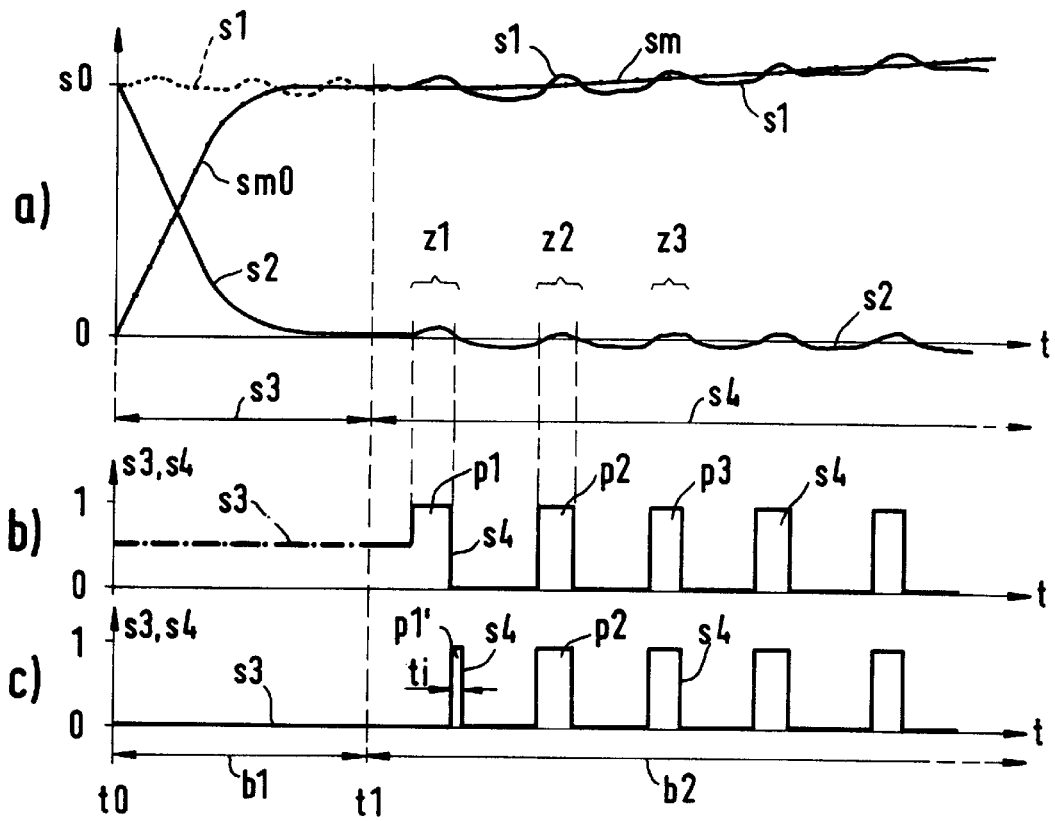
FIG. 3 is a schematic timing diagram showing a few signal waveforms.

FIG. 3 is a timing diagram showing typical signal waveforms of a Hall-effect sensor in a tachometer. Chart a) shows a sensor signal s1 from a gear sensor biased with a constant magnetic field. The DC level s0 corresponds, for example, to a magnetic field of 200 mTesla, and the superposed sensor signal s2 to an amplitude of approximately 5 mTesla. The mean sensor signal value sm increases slightly due to a drift process. The drift process is shown exaggerated for the sake of clarity. During the first operating state b1, the measured setting value sm0 increases rapidly to the DC level s0, while the output signal s2 of the input amplifier 3 approaches zero. The compensated condition is reached at the instant t1 at the latest, i.e., the output signal of the input amplifier 3 corresponds to the superposed sensor signal 2, so that the switching signal s4 can be formed from this signal s2. By the first, second, and third teeth z1, z2, z3 of the gear, the pulses p1, p2, p3, etc. are then triggered. To prevent the output signal s3 from being unnecessarily switched back and forth during the first operating state b1, the signal is tied to a fixed voltage level by means of the controller 9 or the setting facility 5, or brought to a so-called tristate condition. In chart 3b, a fixed intermediate level is preset, so that the signal of the first tooth z1 triggers a first pulse p1, regardless of which tooth area the setting value sm0 relates to. Better detection of the first tooth is possible with the signal waveform of FIG. 3c, where in the first operating state b1 the output signal s3 is advantageously clamped to zero level. The passing leading or trailing side of the first tooth z1 is then detected by means of the deviation of the sensor signal s2 from the stored setting value sm0, producing a first pulse p1' of a predetermined length ti. The circuits connected to the sensor device thus receive information on the first tooth z1. The subsequent pulses p2, p3, etc. are then produced as in FIG. 3b.

FIG. 4 is a timing diagram illustrating the tracking of the mean sensor signal sm in some more detail. The first chart a) shows the superposed sensor signal s2 with a few relative extreme values in the positive and negative directions. The optimum mean value sms is also referred to as the "median value", since it lies in a median signal range, regardless of the pulse duty factor. To illustrate this, the arithmetic mean sma is shown, which takes into account the pulse duty factor and is therefore unsymmetrical with respect to the relative extreme values. If this value sma is used as the first switching threshold, even small interfering or noise signals may initiate false output signals s4. The chart of FIG. 4b shows in exagerated form how the mean sensor signal value sm varies on the occurrence of the relative extrema of the superposed sensor signal s2. If the relative extreme values persist for a relatively long time, it is not suitable if the tracking of the mean sensor signal value sm takes place for the whole duration of the output pulses s4. The readjustment is therefore coupled to the signal edges and ends approximately when the sensor signal s2 reaches the relative extreme value. The average ms formed in the averager 7.1 is not used direct as a compensation value for the DC level s0, but is modified by means of a control filter, such as a PID arrangement. The smallest change value corresponds to one LSB step, and the rate of change may also be dependent on the amplitude value as.

If during the second operating state b2 the mean signal value sm is not exceeded for a prolonged period of time, either the gear is completely at rest or the mean sensor signal value sm is totally false due to some disturbance. In that case, a third operating state initiated by the controller 9 after an interval tv2 enables the mean sensor signal level sm to be gradually led back in the direction of the desired value sms. As soon as the mean sensor signal sm lies within the superposed sensor signal s2, the normal function of the tracking circuit 8.1 performs the tracking again. This acts on the time interval tv2 like a reset function, so that the slow tracking of the third operating state no longer becomes effective.

The embodiments of FIGS. 1 and 2 can also be modified so that the output stages 4 can produce more than two output levels in order to transmit further information within an output data sequence dependent on a gear sensor. The output stages 4 may also be designed as switched current sinks which, preferably in the case of two-pin sensors, control the respective power consumption for the information transfer.

What is claimed is:

1. A sensor device comprising:
   a controller defining at least a first operating state and a second operating state, said first operating state being preferably triggerable by application of a supply voltage,
   a setting facility which in said first operating state adapts the operating range of a measuring facility to the respective DC level of a sensor signal by a setting value (sm0), and which in said second operating state determines a mean sensor signal value, and
   an output circuit producing in said first operating state a first output signal, which is independent of said sensor signal, and in a defined state, and in said second operating state a second output signal which is dependent on a sensor signal superposed on said mean sensor signal value.

2. The sensor device of claim 1 further comprising an amplitude detector coupled to said measuring facility to determine the amplitude of said superposed sensor signal.

3. The sensor device of claim 2, wherein said amplitude detector controls a hysteresis threshold and/or the gain of said measuring facility.

4. The sensor device of claim 1 wherein said setting facility changes said mean sensor signal value only if a new mean sensor signal differs from the existing mean sensor signal value by a predetermined amount.

5. The sensor device of claim 4, wherein said mean sensor signal value and/or said setting value are stored as digital values in an on-chip memory device, particularly in a nonvolatile memory device.

6. The sensor device of claim 7, wherein the setting and/or control parameters are stored as digital values in an on-chip memory device, particularly in a nonvolatile memory device.

7. The sensor device of claim 3, wherein said hysteresis threshold is preset as a stored value, and wherein in said second operating state, said hysteresis threshold is modified as a function of the amplitude value.

8. The sensor device of claim 3, wherein in said second operating state, said setting facility changes said mean sensor signal value in a first time interval which begins with an intersection of said superposed sensor signal and said mean sensor signal value and ends approximately with the attainment of a relative extreme value of said superposed sensor signal.

9. The sensor device of claim 8, wherein said change in said mean sensor signal value takes place in a third operating state initiated by said controller if no change of the sign of said superposed sensor signal occurs within a predetermined second time interval, with the direction of the change in said mean sensor signal value being determined by the sign of said superposed sensor signal or said second output signal.

10. The sensor device of claim 3, wherein said setting facility changes said mean sensor signal value only if a new mean sensor signal differs from the existing mean sensor signal value by a predetermined amount.

11. The sensor device of claim 2 wherein in said second operating state said setting facility changes said mean sensor signal value in a first time interval which begins with an intersection of said superposed sensor signal and said mean sensor signal value and ends approximately with the attainment of a relative extreme value of said superposed sensor signal.

12. The sensor device of claim 11, wherein said change in said mean sensor signal value takes place in a third operating state initiated by said controller if no change of the sign of said superposed sensor signal occurs within a predetermined second time interval, with the direction of the change in said mean sensor signal value being determined by the sign of said superposed sensor signal or said second output signal.

13. The sensor device of claim 2, wherein said setting facility changes said mean sensor signal value only if a new mean sensor signal differs from the existing mean sensor signal value by a predetermined amount.

14. The sensor device of claim 1 wherein in said second operating state said setting facility changes said mean sensor signal value in a first time interval which begins with an intersection of said superposed sensor signal and said mean sensor signal value and ends approximately with the attainment of a relative extreme value of said superposed sensor signal.

15. The sensor device of claim 14, wherein said change in said mean sensor signal value takes place in a third operating state initiated by said controller if no change of the sign of said superposed sensor signal occurs within a predetermined second time interval, with the direction of the change in said mean sensor signal value being determined by the sign of said superposed sensor signal or said second output signal.

16. The sensor device of claim 1, wherein in said operating state, said output circuit delivers as said second output signal a pulse of predetermined duration when a deviation of said superposed sensor signal from said mean sensor signal value stored in said first operating state is detected by said measuring facility for the first time.

* * * * *